Figure 1A:
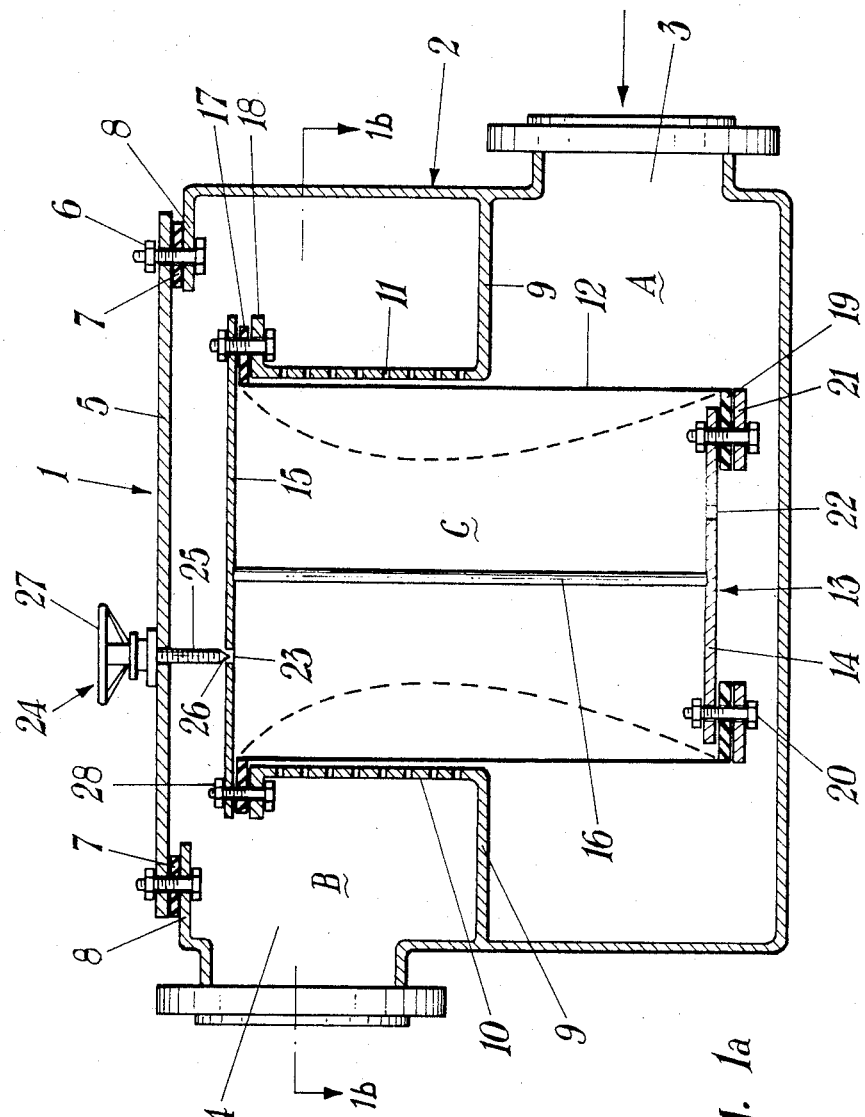

United States Patent [19]

Brugnoli

[11] Patent Number: 4,683,907
[45] Date of Patent: Aug. 4, 1987

[54] VALVE FOR THE INTERCEPTION AND REGULATION OF FLOW WITH A FIXED TUBULAR SEALING ELEMENT

[75] Inventor: Vincenzo Brugnoli, Viterbo, Italy
[73] Assignee: Francesco Amici, Rome, Italy
[21] Appl. No.: 842,940
[22] Filed: Mar. 24, 1986
[51] Int. Cl.[4] .................... F16K 31/18; F16K 31/128
[52] U.S. Cl. ........................................ 137/414; 251/5; 251/45; 251/61.1; 251/901
[58] Field of Search .................. 251/5, 25, 33, 37, 45, 251/46, 61.1; 137/414, 625.28

[56] References Cited

U.S. PATENT DOCUMENTS

| | | | |
|---|---|---|---|
| 848,739 | 4/1907 | Gut | 251/46 |
| 1,851,062 | 3/1932 | Protzer | 251/46 |
| 2,360,873 | 10/1944 | Grove | 251/5 |
| 2,939,672 | 6/1960 | Rich | 251/5 |
| 3,690,344 | 9/1972 | Brumm | 251/61.1 |
| 3,716,071 | 2/1973 | Passera | 251/61.1 |
| 3,836,113 | 9/1974 | Johnson | 251/61.1 |
| 4,050,669 | 9/1977 | Brumm | 251/61.1 |

FOREIGN PATENT DOCUMENTS 19951 10/1882 Fed. Rep. of Germany ........ 251/45
1122337 1/1962 Fed. Rep. of Germany ..... 251/61.1

Primary Examiner—George L. Walton
Attorney, Agent, or Firm—Samuels, Gauthier, Stevens & Kehoe

[57] ABSTRACT

A valve acting as a gate valve or as a cock, whose body is divided into two chambers that communicate respectively with the inlet and the outlet. A fixed tubular sealing element is arranged therein, which consists of a flexible sleeve that, when in its swollen configuration, seals the holes of a riddled hollow cylinder in which it is housed, said sleeve acting thus on the flow from the first chamber to the second one through said holes. A third chamber is obtained within said tubular sealing element, a small part of the total flow passing through said chamber; thus, by the regulation of the flow rate of said mirror flow, by means of a stem valve assembly, the automatic regulation is corresondingly obtained of the main flow passing to the outside part of said sleeve, so that the regulation is obtained of the whole fluid stream.

9 Claims, 2 Drawing Figures

VALVE FOR THE INTERCEPTION AND REGULATION OF FLOW WITH A FIXED TUBULAR SEALING ELEMENT

BACKGROUND OF THE INVENTION

The present invention relates to a valve for the interception and the regulation of a fluid flow with a fixed tubular sealing element.

More particularly, the present invention relates to a valve acting as a gate valve or as a cock, which intercepts and regulates the fluid flow within a pipeline, essentially by means of a fixed flexible tubular sealing element.

Gate valves and cocks are mainly employed in order to intercept fluid streams along a pipe; the action of such valves and cocks is principally that of allowing the fluid flow to occur or that of interrupting such flow, but such devices can also act as flow rate regulation devices though not in an optimal way.

Cocks are the most employed devices for smalll-size pipes, both in the industrial and in the civil field, for instance in the case of plumbing systems. Cocks can be manually operated and they generally have a sealing element of the plug type bearing one or more passageways or through-holes, which sealing element can be rotated within a housing or seat so that said passageways can be aligned or not with the ports in the valve body through which the fluid flows.

Gate valves are more often employed in the case of high flow rate pipes and in industrial applications, and they can be operated either manually or by means of a motor; the sealing member in such valves is made up of a wedge-shaped baffle that runs transversally with respect to the body of the valve and to the pipe; its shift is generally obtained by screwing the stem on a nut screw, through a handwheel in the case of manual operation.

In both the abovementioned solutions, the whole power for reducing or intercepting the fluid flow by opposing the pressure of the fluid itself is to be supplied by the member which drives the sealing element, i.e. such power is to be supplied from the outside; particularly in the case of gate valves of large sizes, high efforts are needed for operating the handwheel by hand or otherwise high starting torques and quite high consumption are necessarily met with if a motor is employed for operating the valve.

Moreover, the bodies of said valves are generally bulky and quite costly both as regards their production and their maintenance.

SUMMARY OF THE INVENTION

Thus, it is an obJect of the present invention that of supplying a valve which is capable of performing the same functions as a cock or a gate valve but which requires a remarkably lower work for its operation, be it manual or through a motor.

It is a further object of the present invention that of supplying a valve for intercepting and regulating a fluid flow, in which valve a part of the fluid energy within the pressure pipe can be exploited for supplying most of the work needed for operating the valve.

A further object of the invention is that of supplying a valve for intercepting and regulating a fluid flow, which valve is of a simple and cheap structure and of reduced overall dimensions.

These and other objects are achieved according to the present invention by a valve in which the total flow is divided into two internal paths of flow which join at the outlet; the lower flow rate stream is regulated through a stem valve assembly of small size, and this regulation reflects automatically, through the action of a special flexible fixed tubular sealing element, on the remaining part of the fluid stream, so that the regulation or the interception is obtained of the whole flow through the valve.

The valve according to the present invention is made up of a body which is divided into two chambers that communicate respectively with the inlet and the outlet; a dividing baffle is arranged between these two chambers, said baffle having a central aperture from which a tubular member extends bearing a number of hoes, said riddled tubular extension being oriented towards the chamber which is in communication with the outlet; a flexible sleeve is arranged inside said tubular extension, such sleeve having the function of a fixed sealing member, which in its swollen configuration adheres to the inside wall of said tubular extension, thus closing the ports through the same from one chamber to the other one, whereas in its contacted configuration it detaches from the same, thus allowing the fluid stream to flow. The inside of said fixed sealing element forms a third chamber which is crossed by a very small amount of the fluid stream; the discharge from said chamber is controlled from the outside by a small stem valve assembly: by opening or closing said stem valve, the fluid pressure inside the flexible sleeve can be decreased or increased, so as to cause respectively an increase or a decrease in the deflection of the walls of said sleeve.

Thus, the fixed tubular sealing element is operated by the pressure of the fluid stream itself in the pipe, whereas the power to be supplied from the outside is just that which is sufficient for regulating the minor fraction of the fluid stream.

BRIEF DISCLOSURE OF THE DRAWINGS

Figure 1B:
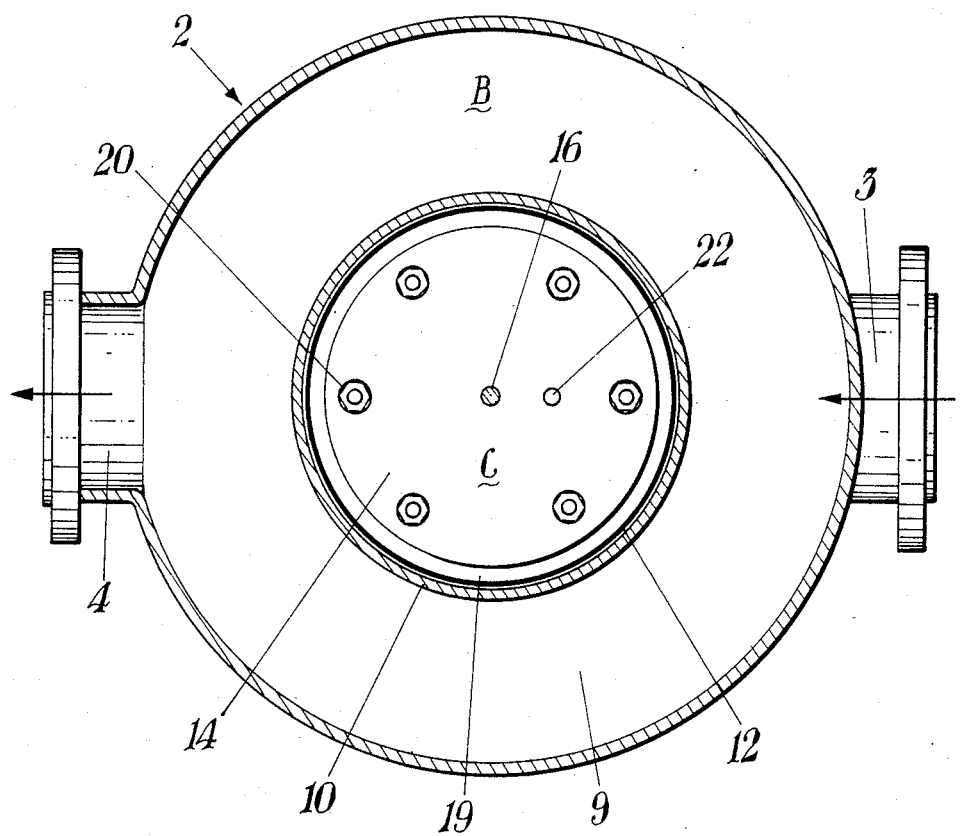

The present invention is illustrated for exemplification purposes in the Figures of the enclosed drawings, wherein:

FIG. 1a is a vertical sectional view of an embodiment of the valve according to the present invention; and FIG. 1b is a cross sectional view of the valve of FIG. 1a taken on line 1b—1b.

DETAILED DISCLOSURE

With reference to both the Figures above, the valve 1 comprises a hollow body 2, which in the present case is of a cylindrical shape, its axis being at right angles to the direction of the pipeline. The body 2 bears at its opposite ends two flanged pipe fittings 3 and 4 for its connection respectively with the inlet and outlet pipes. The body 2 is closed at the top by a cover 5 which is fixed, by means of bolts 6 and through the interposition of a gasket 7, to a flange 8 which is integral with the body 2.

Two chambers A and B are obtained in the body 2 which communicate respectively with the inlet and the outlet and are separated from one another by the baffle 9; a hollow cylindrical extension 10 perforated by small holes 11 extends from the central hole of said baffle 9 towards said chamber B, the fluid stream passing from the chamber A into the chamber B through said perforated cylindrical extension.

A flexible sleeve 12 is housed inside said extension 10, thus performing the function of a fixed sealing element and being supported by a spool-shaped member 13 which consists of two disks 14 and 15 and of a spacer pin 16; said sleeve 12 is sealed at the top through the interposition of its annular rim 17, bent at right angle towards the outside, between the disk 15 and a flange-shaped end 18 integral with said cylindrical extension 10, and through the tightening of bolts 28. Similarly at the bottom the annular rim 19 of the sleeve 12 is bent at right angle toward the inside and is seal tightened by means of bolts 20 between the disk 14 and a free annular flange 21.

A third chamber C is formed between the sleeve 13 and the two disks 14 and 15, which chamber communicates with chambers A and B respectively through the ports 22 and 23. The outlet port 23 from chamber C is coupled with a stem valve assembly 24 having a threaded stem 25 passing through the cover 5 and ending inside in a tip 26 performing the function of a pin-type sealing member, whereas outside it is connected with a handwheel 27. Any type of knob-like end suitable for manual operation can be provided instead of said handwheel, such as for instance a screw head.

The fluid flow entering the valve at 3 divides into two paths: the first one passes outside the fixed sealing element consisting of the sleeve 12, direct from chamber A to chamber B through the holes 11, whereas the second path passes from the chamber A to the chamber C through the port 22 and from C to B through the port 23. The fluid streams join again just before the outlet 4.

Obviously the fluid pressure within the chamber A is higher than the pressure within the chamber B; before dividing into two streams, the fluid is at the pressure of chamber A, then the small amount of fluid that flows through the port 22 decreases its pressure by an amount which is equal to the pressure drop through 22; a similar decrease occurs in the flowing through 23.

Thus, when the stem valve assembly 24 is not closed, the pressure within the chamber C is higher than the pressure in the chamber B and lower than the pressure in A, and the more the valve assembly 24 is open, the more such pressure is lower than the pressure in A; such pressure difference on said sleeve 12 causes the same to become inflected towards its inside (for instance along the dotted lines) so that the largest amount of the fluid flow is allowed to pass through the ports 11 of the tubular extension 10.

When the stem valve assembly 24 is fully open, the minimum pressure occurs within C, while the sleeve 12 is in its configuration of maximum contraction, and the maximum flow rate passes both through the inside path and through the path outside said sleeve 12; when the stem sealing member 26 is gradually closed, the flow rate of the minor stream is reduced, the pressure within C increases, the deflection of the fixed sealing element 12 is also reduced, and the flow rate of the major stream is lowered; when the stem valve assembly 24 is completely closed, the fluid stagnates within the chamber C, and in said chamber the same pressure conditions occur as within chamber A, while the sleeve 12, going back to its cylindrical configuration, seals the holes 11 so as to prevent also the major fluid stream from flowing.

Any leakage through the ports 11 would cause an instantaneous decrease in the pressure within chamber A, and therefore it would cause the sleeve 12 to exert a higher pressure on the inside wall of 10.

From the above disclosure of how the valve of the present invention works, it is clear that said valve requires a minimum power for its operation: indeed, it is sufficient to control a very small fraction of the total fluid stream in order to obtain the desired regulation of the whole stream, through the automatic operation of the fixed sealing element, thereby exploiting the power contained within the fluid stream that flows in the pipe for substituting a large part of the power that normally should be supplied from the outside.

The port 22 can be reduced in area by hundreds of times with respect to the total cross-sectional area of the passageways 11, thus reducing the flow rate through the chamber C, as well as the size of the valve assembly 24 and the power needed for operating the same. Preferably, a ratio between 10 and 500 is adopted between the total area of the holes 11 and the area of the port 22.

The above-disclosed advantages of power saving and easy operation, which characterize the valve according to the present invention, are especially of value in the case of high flow rate pipes, where such valve can be advantageously employed instead of the standard bulky gate valves.

Further advantages of the valve according to the invention are evidently given by the simple structure and by the reduced size of the same, which features make its production cheap and its cleaning and maintenance easy, and in addition make the valve long lasting and reliable, giving also the device a pleasing aesthetic appearance.

According to another embodiment of the present invention, the cylindrical body of the valve is coaxial with the inlet and the outlet pipes, so that said valve assumes the configuration of a cylindrical part of enlarged diameter arranged along the line of said pipe, the axis of the fixed tubular sealing element is also parallel to the axis of the pipes. The stem valve assembly in that case can be oriented with its stem at right angles to the lying direction of the pipes, the head of said stem emerging from the side wall of the cylindrical body and coupling with a housing or seat consisting of a thin elbow tube protruding from the disk of said spool-shaped member.

A further advantageous application of the valve according to the present invention consists in the employment of the same as a float faucet for filling a toilet flushing tank. In that case, said valve is arranged inside the flushing tank, at the end of the water inlet pipe, the stem of the valve assembly, which stem is not threaded in that case, being directed downward and connected direct with a floating body of the well known type employed in such applications.

Said floating body operates through its shiftings the valve assembly, so as to close the port when it moves upwards and to open the same when it moves downwards; thus, the weak force that it can exert because of its floating on the water surface is sufficient to operate a valve that intercepts and regulates the whole flow rate needed for filling the flushing tank. The main advantage of such type of application consists in avoiding the long force amplifying lever arm that is employed in the toilet flushing tanks of the traditional type, where the force of the floating body is to control the whole flow rate for filling the flushing tank. Thus, a toilet flushing tank can be realized whose size is much reduced, and whose design can also be quite different from the traditional ones, for instance it can be of an elongated cylindrical shape.

Moreover, the maximum water level can be adjusted quite easily by shifting the floating body along the short vertical axis that connects the same direct to the stem sealing member, and the seal gaskets do not undergo the very high and damaging pressures that originate in the usual case from the presence of the force amplifying lever when the floating body is at its maximum height.

The present invention has been disclosed with particular reference to some of its specific embodiments but it is to be understood that modifications and changes can be introduced in the invention by those who are skilled in the art without departing from the spirit and scope of the invention itself for which a protection is sought.

What is claimed is:

1. A valve for controlling the flow of a fluid, said valve comprising:
   a hollow body internally subdivided by a baffle member into first and second chambers, said baffle member including a tubular extension which is perforated by a plurality of openings and which extends into said second chamber;
   an inlet in said body through which said fluid may enter said first chamber and an outlet in said body through which said fluid may exit from said second chamber;
   an open ended flexible tubular sealing element surrounded by said tubular extension and extending between said first and second chambers;
   first and second closure elements arranged respectively in said first and second chambers to close the ends of said tubular sealing element and to cooperate therewith in defining a third chamber interposed between said first and second chambers;
   a first port in said first closure element through which a portion of the fluid in said first chamber may flow into said third chamber, and a second port in said second closure element through which the said portion of fluid may flow from said third chamber into said second chamber; and
   regulator means for varying the fluid pressure in said third chamber by controlling the flow of fluid through said second port, whereupon when the fluid pressure in said first and third chambers is equalized, said flexible sealing element is caused to expand outwardly against said tubular extension to block said openings and prevent fluid flow therethrough from said first chamber to said second chamber, and when the fluid pressure in said third chamber is lowered beneath that in said first chamber, said flexible tubular sealing element is caused to collapse inwardly away from said tubular extension, thereby allowing fluid flow from said first chamber through said openings to said second chamber.

2. A valve according to claim 1 wherein said first and second closure elements comprise rigid discs held in an axially aligned mutually spaced relationship by an elongated connecting member extending therebetween.

3. A valve according to claim 2, wherein said flexible sealing element has, at its end oriented towards said second chamber, an annular rim which is bent radially outwardly, said rim being tightly sealed between one of said disks and a flange-shaped end of said tubular extension and, at its end oriented towards said first chambr, an annular rim bent angularly inwardly and tightly sealed between the other of said disks and an annular flange member.

4. A valve according to claim 2 wherein said inlet and said outlet comprise flanged pipe fittings.

5. A valve according to claim 2 wherein the ratio between the total cross-sectional area of the openings in said tubular extension and the area of said first port is between 10 and 500.

6. A valve according to claim 2 wherein said regulator means comprises a threaded stem which is provided at one end externally of said housing with a head member for the operation of said stem.

7. A valve according to claim 6 wherein the other end of said threaded stem constitutes a pin-type sealing element for opening and closing said second port.

8. A valve according to claim 6 wherein said body includes a detachable cover partially enclosing said second chamber and through which extends said threaded stem.

9. A valve according to claim 2 wherein said regulator means is arranged in the lower part of the valve and is adapted to be operated by a floating body of the type employed in toilet flushing tanks.

* * * * *